F. C. HEYLMAN.
STOP COCK.
APPLICATION FILED DEC. 10, 1918.

1,354,460.

Patented Sept. 28, 1920.

F. C. Heylman
Inventor

By Lancaster and Allwine
his Attorneys

UNITED STATES PATENT OFFICE.

FREDERICK C. HEYLMAN, OF MARTINEZ, CALIFORNIA.

STOP-COCK.

1,354,460.      Specification of Letters Patent.      Patented Sept. 28, 1920.

Application filed December 10, 1918. Serial No. 266,107.

*To all whom it may concern:*

Be it known that I, FREDERICK C. HEYLMAN, a citizen of the Netherlands, residing at Martinez, in the county of Contra Costa and State of California, have invented certain new and useful Improvements in Stop-Cocks, of which the following is a specification.

This invention relates to stop cocks or valves particularly designed for use for controlling the passage of fluid, gas, air, steam or the like, under high pressure and an object of the invention is to provide a double packed stop cock which employs an extra guard or packing gland having a laterally projecting annular flange upon the outer edge of which is formed a depending annular flange adapted for detachable connection with the body of the stop cock or valve structure and to provide a cutting edge upon the body of the stop cock or valve for biting into the inner surface of said annular flange to form a fluid-tight closure to prevent the escape of fluid from within the valve or stop cock structure.

Other objects of the invention will appear in the following detailed description, taken in connection with the accompanying drawing, forming a part of this specification, and in which drawing.

Figure 1:
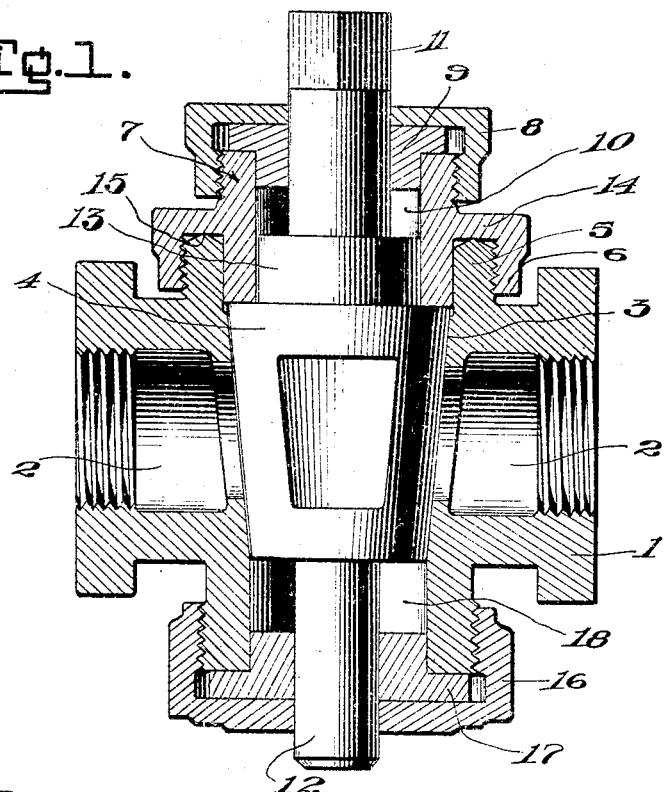
Figure 1 is a vertical section through the improved stop cock or valve structure.
Figure 2:
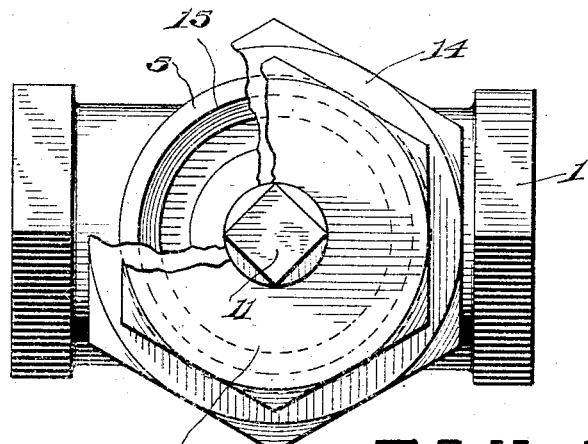
Fig. 2 is a top plan of the valve or stop cock structure, showing parts thereof in section.

Referring more particularly to the drawing, 1 indicates the main body of the valve or stop cock structure which is provided with the ways 2 to permit the passage of fluid through the body, and which body is also provided with a transverse way or seat 3 for the cone valve 4 which controls the passage of fluid through the ways 2. The body 1 of the stop cock structure is provided with an upwardly extending annular flange or circular portion 5 concentric with the valve seat 3, the outer surface of which upwardly extending flange is threaded, for detachable connection with the depending annular flange 6 of the guard or packing gland 7. This guard or packing gland 7 is cylindrical in shape and its lower portion fits within the ring flange 5 while its upper portion is externally threaded for detachable connection with the screw cap 8. This screw cap 8 is provided for securely clamping a packing gland 9 against the outer end of the packing gland or guard 7 and for confining any suitable packing material in the space 10, if it is so desired. The cone valve 4 has a stem 11 projecting upwardly therefrom, and a second stem 12 projecting downwardly from the lower end of the cone. The stem 11 is provided with an enlarged portion 13 at the upper end of the cone 4 against the outer end of which any packing material placed within the space 10 is adapted to engage.

The packing gland or guard 7 is provided with an annular horizontal gland 14 formed thereon intermediate its ends upon the outer edge of which the depending flange 5 is formed. The upper surface of the ring flange 5 is beveled from both edges toward the center, providing a relatively sharp or biting edge intermediate the inner and outer sides of this flange as clearly shown at 15 in the drawings. The biting edge 15 will bite into the under or inner surface of the horizontal flange 14, when the gland or guard 7 is properly tightened upon the spring flange 5, forming a fluid-tight joint between the gland or guard 7 and the body 1 to prevent the escaping of fluid therefrom.

In mounting, the gland or guard 7 upon the body, in the first instance, should the biting edge or rib 15 form only arcuate instead of circular contact with the inner surface of the horizontal flange 14, the under surface of the flange may be gouged or cut out sufficient to permit the forming of circular contacts between the inner surface of the flange and biting rib 15 or the high portion of the rib may be ground down to conform to the remaining portion so as to provide a circular contact between the two to form the fluid-tight joint.

A screw cap 16 is mounted upon the lower end of the body and holds a packing gland 17 in place. If it is so desired, any suitable type of packing material may be placed within the space 18 between the inner end of the packing gland 17 and the lower end of the valve cone 4.

Changes in details may be made without departing from the spirit of this invention, but;

I claim:

1. In a stop cock, the combination, of a body provided with a fluid way, a valve cone rotatably mounted in said body for controlling the passage of fluid through said way, a ring flange formed upon the body concentric of the axis of said valve cone, and having its outer edge beveled to form a centrally disposed biting rib, a gland mounted on said ring flange, an annular flange formed upon said gland and extending within the ring flange and into contact with a shoulder on the valve cone, a depending flange formed about the outer edge of said gland and detachably connected to said ring flange, said biting edge adapted to bite into the under surface of said gland to form a fluid-tight joint between the gland and body.

2. In a stop cock, the combination, of a body provided with a fluid way, a valve cone rotatably mounted in said body for controlling the passage of fluid through said way, a ring flange formed upon the body concentric of the axis of said valve cone, and having its outer edge beveled to form a centrally disposed biting rib, a gland mounted partially within said ring flange, a horizontal annular flange formed upon said gland, a depending flange formed about the outer edge of said horizontal flange and detachably connected to said ring flange, said biting edge adapted to bite into the under surface of said horizontal flange to form a fluid-tight joint between the gland and the body, the inner end of said gland engaging the upper end of said valve cone.

3. In a stop cock, the combination, of a body provided with a fluid way, a valve cone rotatably mounted in said body for controlling the passage of fluid through said way, a ring flange formed upon the body concentric of the axis of said valve cone, and having its outer edge beveled to form a centrally disposed biting rib, a gland mounted partially within said ring flange, a horizontal annular flange formed upon said gland, a depending flange formed about the outer edge of said horizontal flange and detachably connected to said ring flange, said biting edge adapted to bite into the under surface of said horizontal flange to form a fluid-tight joint between the gland and the body, the inner end of said gland engaging the upper end of said valve cone, a screw cap detachably connected to the outer end of said gland.

FREDERICK C. HEYLMAN.